United States Patent [19]

Feder

[11] Patent Number: 5,325,652
[45] Date of Patent: Jul. 5, 1994

[54] CONTOURED MARBLE AND METHOD OF FABRICATION

[76] Inventor: David Feder, 1626 Foothill La., Santa Ana, Calif. 92705

[21] Appl. No.: 930,810

[22] Filed: Aug. 17, 1992

[51] Int. Cl.⁵ .................. E04G 21/14; E04G 23/00; E04F 13/14
[52] U.S. Cl. ...................... 52/746; 52/249; 52/388; 52/725; 52/727; 52/744
[58] Field of Search ............... 52/384, 385, 388, 245, 52/247, 744, 127.3, 727, 728, 249, 641, 301, 285.1, 285.2, 285.3, 285.4, 80.1, 80.2, 108, 506, 746, 725

[56] References Cited

U.S. PATENT DOCUMENTS

| | | | |
|---|---|---|---|
| 476,354 | 6/1892 | Ams . | |
| 858,499 | 7/1902 | Bird . | |
| 871,420 | 11/1907 | Kohout | 52/384 |
| 2,508,128 | 5/1950 | Waards | 52/249 |
| 2,874,812 | 2/1959 | Clevett, Jr. | 52/727 |
| 2,887,867 | 5/1959 | Burchenal et al. | 72/22 |
| 3,077,059 | 2/1963 | Stout | 52/388 |
| 3,411,257 | 11/1968 | Yaremchuk | 52/415 |
| 3,740,911 | 6/1973 | O'Leary | 52/388 |
| 3,963,846 | 6/1976 | Bourke | 428/73 |
| 4,146,599 | 3/1979 | Lanzetta | 264/35 |
| 4,361,995 | 12/1982 | Buck et al. | 52/309.17 |
| 4,406,099 | 9/1983 | Barrett | 52/127.3 |
| 4,804,569 | 2/1989 | Arisawa | 428/47 |
| 4,888,928 | 12/1989 | Rea et al. | 52/387 |
| 4,920,716 | 5/1990 | Coffey | 52/386 |
| 5,060,433 | 10/1991 | Buryan et al. | 52/235 |

Primary Examiner—Michael Safavi
Attorney, Agent, or Firm—Walter A. Hackler

[57] ABSTRACT

A building facade material includes a plurality of elongate stone strips held in an abutting relationship on a flexible mesh when in a plane with the flexible mesh enabling the strips to be adhered to a curved surface, with a V-shaped area between strips suitable for grouting, between adjacent elongate stone strips. The elongate stone strips have a thickness which enables the strips to be ground to an arcuate contour without exposing the flexible mesh. A color-matching settable material is provided for grouting the V-shaped areas between the elongate strips. The method for applying a stone facade includes the steps of adhering a plurality of abutting elongate strips of stone attached to a flexible backing over a curved surface, grouting the groutable spaces with a settable material and thereafter grinding the entire composite into a smooth, arcuate, non-seamed, solid-stone appearing arcuate surface or column.

2 Claims, 2 Drawing Sheets

CONTOURED MARBLE AND METHOD OF FABRICATION

The present invention is generally related to methods and materials for providing natural stone surfaces and, more particularly, directed to a building facade and material, along with a method for providing curved stone surfaces on infrastructures, thereby eliminating a need for solid stone building materials, such as columns, pillars and the like.

A building facade composed of natural stone such as marble, granite, among others, is typically applied in sheets to flat surfaces on buildings. Many systems have been devised for mounting the stone slabs to the building structure such as, for example, set forth in U.S. Pat. No. 5,060,433.

All of these techniques, however, are applicable to the use of such stone slabs and panels on flat surfaces.

In view of the weight of such natural stone slabs or panels, stone-faced composite surface elements, such as described in U.S. Pat. No. 3,963,846, have been developed which include a laminate of natural facing stone bonded by adhesive to a backing of a lightweight multicellular material. This development overcomes the weight and expense of solid stone sheets which are liable to fracture if not of proper thickness. These laminar elements have particular use in providing a natural stone facing to ceilings, or elevators and the like where weight is of the utmost importance.

Heretofore, all curved surfaces and/or columns and pillars, which have been used in combination with the hereinabove-referenced stone panels or laminate stone elements, have been composed of solid stone building elements. The rigidity of natural stone prevents any significant bending thereof and heretofore the only solution for providing curved, rounded, or arcuate surfaces was to utilize a solid piece of natural stone, which is carved or ground into the desired contour.

The obvious disadvantages of such building block material is its excess weight in addition to the high cost of fabrication associated therewith.

Another technique for applying a weather-resistant surface to curved surfaces is the use of small, rounded tiles, with the size of the tiles being selected in order that the maximum dimension of the tiles subtends a very small arc in the contoured surface, thereby simulating a curved surface by a series of interconnected flat tiles. To solidify the tile arrangement and weatherproof the surface, spaces between the tiles are grouted with a suitable material, which results in a mosaic-type surface which is totally unlike the appearance and beauty of a solid, natural stone surface, particularly when the latter is polished.

The present invention provides a building facade material and building facade, along with a method of utilizing the material, in order to provide a realistic, solid stone appearance, such as marble, granite or the like, on curved surfaces such as columns, pillars and building contours.

SUMMARY OF THE INVENTION

A building facade material, in accordance with the present invention, generally includes a plurality of elongate stone strips and flexible means for holding the elongate stone strips in an abutting relationship when aligned in a plane and for enabling the strips to be adhered to a curved surface. When adhered to the curved surface, adjacent strips form a V-shaped area, suitable for grouting, between the adjacent strips. The thickness of the stone strips provides a means for enabling the stone strips to be ground to an arcuate contour without exposing flexible means.

More particularly, the building facade material of the present invention may include a settable material and a ground stone-like material matching in color the elongate stone strips, which is suitable for grouting in the V-shaped areas.

A combination of the present invention provides a building facade, with the building facade including a plurality of separate elongate stone strips and the mesh material interconnecting the plurality of stone strips adhered to a substrate, with the plurality of stone strips with V-shaped areas therebetween. A grout means is provided and disposed in the V-shaped areas and smoothed to form a continuous surface with the separate stone strips for enabling a plurality of separate elongate stone strips to appear as a solid stone facade.

More particularly, the thickness of the elongate stone strips provides a means for enabling the stone strips to be ground to an arcuate contour without exposing the mesh material. Specifically, the elongate stone strips may have a length with a ratio of at least 30 to 1.

A method in accordance with the present invention for applying a stone facade to a curved surface, in order to achieve a solid stone appearance, includes the steps of adhering a plurality of abutting elongate strips of stone attached to flexible backing over the curved surface, thereby causing groutable spaces between the elongate strips. Thereafter, the groutable spaces are filled, or grouted, with a settable material; and thereafter the settable material is smoothed to form a continuous surface with the elongate strips.

More particularly, in one embodiment of the present invention, the step of smoothing the settable material comprises the step of allowing the settable material to set and thereafter grinding the said settable material and the elongate strips to form a continuous surface. Alternatively, the step of smoothing the settable material comprises the step of shaping the settable material before it sets to form a contiguous surface with the stone strips.

In yet another embodiment of the present invention, the method includes the step of grinding the elongate strips to an arcuate contour before grouting the groutable areas and thereafter smoothing the settable material.

BRIEF DESCRIPTION OF THE DRAWINGS

The advantages and features of the present invention will be better understood by the following description when considered in conjunction with the accompanying drawings in which.

DETAILED DESCRIPTION

Figure 1:
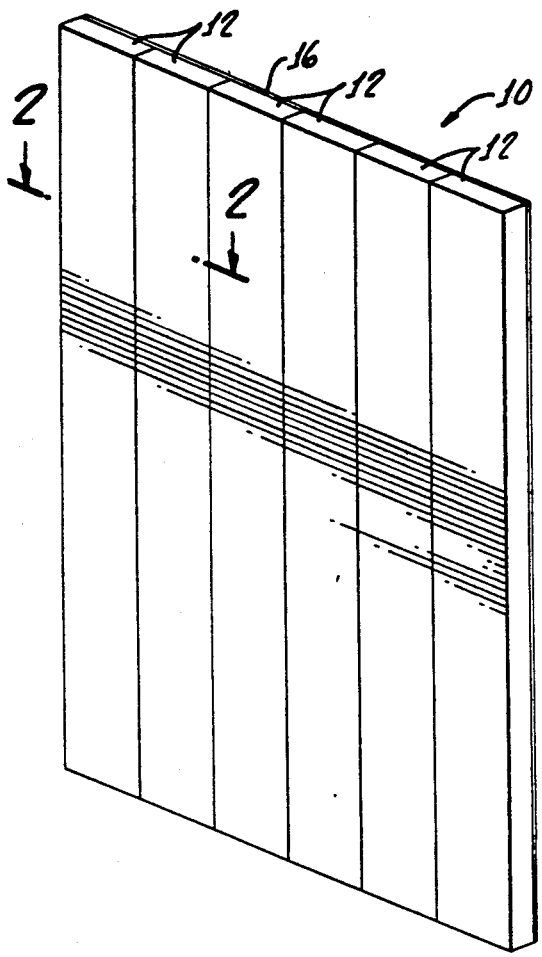
FIG. 1 is a perspective view of a building facade material in accordance with the present invention showing stone strips aligned in a plane.
Figure 3:
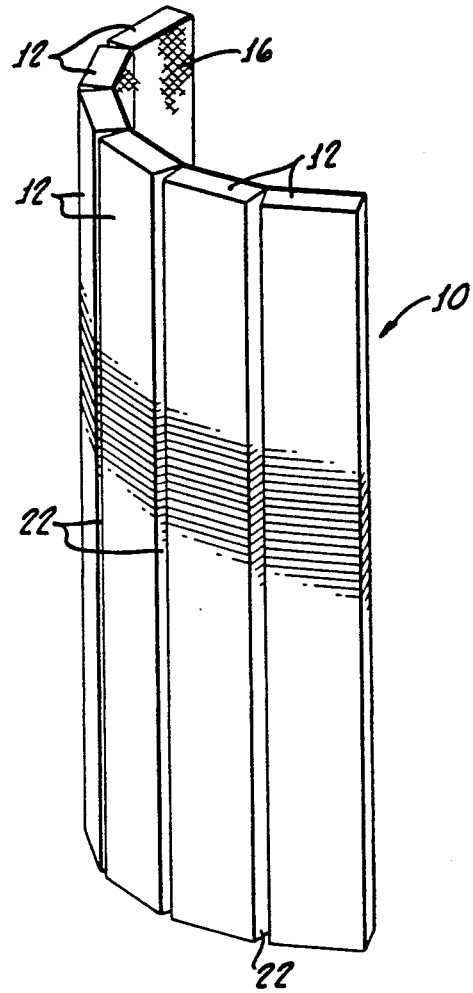
FIG. 3 is a perspective view of the present invention showing the stone strips aligned along a curved surface with V-shaped areas therebetween.
Figure 2:
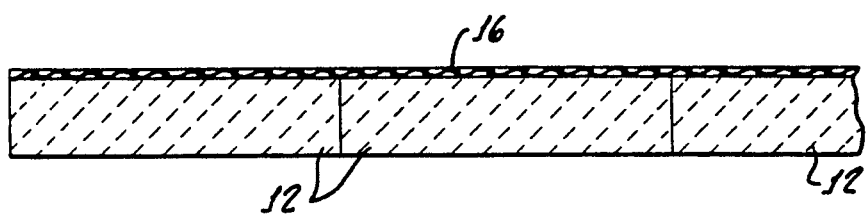
FIG. 2 is a cross-sectional view of the building facade material taken along the line 2—2 shown in FIG. 1.
Figure 4:
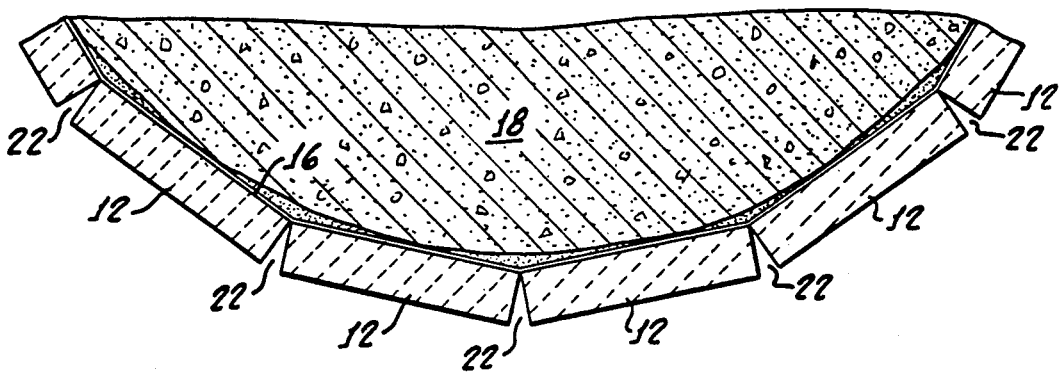
FIG. 4 is a cross-sectional view of the building facade material and substrate.

Turning now to FIGS. 1 and 2, there is shown a building facade 10 which generally includes a plurality of separate elongate stone strips 12 and a mesh material 16 interconnecting the plurality of elongate stone strips 12. FIGS. 3-6 show the facade 10 adhered to a substrate 18 with the plurality of separate elongate stone strips 12 having V-shaped areas 22 therebetween.

Figure 5:
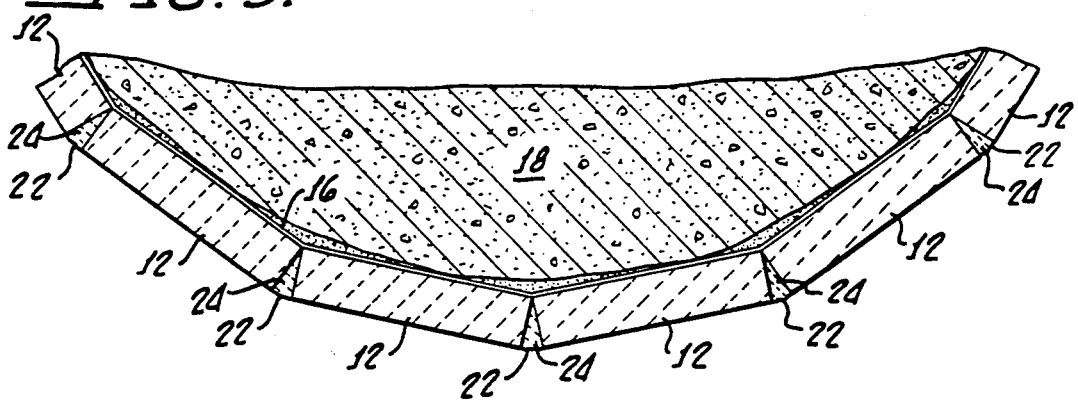
FIG. 5 is a cross-sectional view similar to FIG. 4, showing a grout filling in the V-shaped space.
Figure 6:
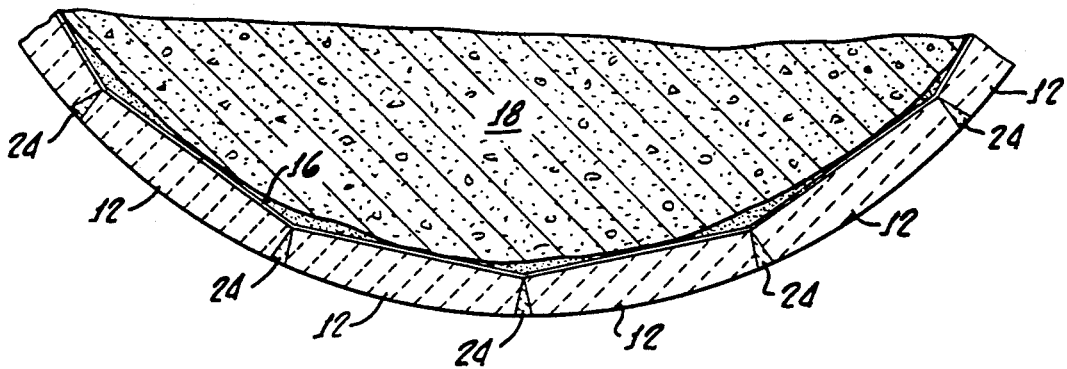
FIG. 6 is a cross-sectional view of the building facade material after grinding to a smooth continuous surface.

In combination therewith, a suitable grout 24 disposed in the V-shaped areas 22 provides a means to form a contiguous surface 28 with the separate elongate stone strips 12, thereby enabling the plurality of separate elongate stone strips to appear as a solid stone facade (see FIGS. 5 and 6).

The stone material may be for example, but not limited to, marble, granite, or other igneous rock of quartz, orthoclare or microline.

The mesh material 16 may be any suitable backing well-known in the art.

The grout 24 may be formed from a suitable settable material such as cement or epoxy, along with ground stone, in order to match the color of the stone strips 12.

It should be appreciated that each of the elements of the building facade 10, taken separately before application to the substrate 18, comprise a building facade material suitable for forming the building facade 10 on any suitable substrate 18.

A substrate 18 may be in the form of a curved building section or a column or pillar to which the building facade 10 is applied. It should also be appreciated that the building facade may be applied to an existing building and thereby transform an existing structure to one having the aesthetic beauty of marble, granite and the like. Plain concrete columns or pillars may be transformed into beautiful marble or granite-looking columns.

Alternatively, a building material 10 and method of the present invention are applicable for the production of new building components such as columns and pillars. In this method, as will be hereinafter discussed in greater detail, a suitable column substrate may be formed from cast concrete, or the like, and thereafter the building facade 10 applied before shipment to the building site.

The stone strips 12 have a great range of dimension but the invention is particularly suited to elongate strips having a length to width ratio of at least 30 to 1. Typical thickness of the strips 12 is selected for providing a means for enabling the elongate strips to be ground to an arcuate contour without exposing the flexible means. Typical stone strips 12, in accordance with the present invention, have dimensions ranging from 1 to 3 inches wide, ½ to 1 inch thick, and a length of 4 feet to 12 feet. However, these examples are not limiting to the invention. The strips 12 may be adhered to the mesh or backing 16 by a suitable adhesive, as is well-known in the tile industry. The mesh 16 and stone strips 12 may be adhered to the substrate 18 by any suitable epoxy adhesive, well-known in the art of adhering stone slabs to substrates in the building construction field.

As shown in FIGS. 1 and 2, the stone strips 12 are adhered to the mesh 16 with the strips 12 abutting one another when they are in the same plane. This is totally different from the hereinabove-referred to tile configurations, wherein tiles are adhered to a substrate in a spaced apart relationship for enabling grout therebetween.

Further distinguishing the present invention from prior art involving tile application is the fact that in tile manufacture, the edges of the tile are glazed in order to provide a protective surface and, as such, cannot be disposed in the abutting relationship with the edges thereof in full contact with adjacent pieces, as is the case with the strips 12 shown in FIGS. 1 and 2.

A method in accordance with the present invention for applying stone facade to a curved surface in order to achieve a solid stone appearance includes the steps of adhering a plurality of abutting elongate stone strips 12 attached to a flexible backing 16 onto a substrate 18 causing the groutable V-shaped spaces, or areas, 22 between the elongate strips 12.

Thereafter, the groutable spaces 22 are filled with the grout, or settable material, 24 and the settable material smoothed to form a contiguous, or continuous, surface 28 with the elongate stone strips 12.

In one embodiment of the present invention, the step of smoothing the settable material 24 comprises the step of allowing the settable material 24 to set and thereafter grinding the set settable material and elongate strips to form the contiguous surface 28. This process provides a smooth, contiguous marble-like surface, totally unlike the appearance of grouted tile which, of course, cannot be ground since that would destroy the glazed surface thereon and also, since part of the glazed surface is removed, would cause an uneven luster to the finished product.

In another embodiment of the method of the present invention, a step of grinding the elongate strips 12 to an arcuate contour may be done before grouting the groutable spaces 22 with the grout 24 and the smoothing thereof can form a contiguous surface with the elongate strips 12.

Although there has been hereinabove described a building facade material, a building facade, and a method for making thereof, in accordance with the present invention, for the purpose of illustrating the manner in which the invention may be used to advantage, it should be appreciated that the invention is not limited thereto. Accordingly, any and all modifications, variations, or equivalent arrangements which may occur to those skilled in the art, should be considered to be within the scope of the present invention as defined in the appended claims.

What is claimed is:

1. A method for forming a solid stone appearing facade on a curved surface, said method comprising the steps of:
    adhering a plurality of elongate stone strips on a flexible mesh with the elongate stone strips in an abutting relationship;
    adhering said flexible mesh to a curved surface and causing groutable spaces between said elongate strips;
    grinding the elongate strips to an arcuate contour and thereafter;
    grouting the groutable spaces with a settable material; and
    smoothing the settable material to form a contiguous surface with said elongate strips.

2. A method for applying a stone facade to a curved surface in order to achieve a solid stone appearance, said method comprising the steps of:
    adhering a plurality of abutting elongate strips of stone, attached to a flexible backing, over the curved surface and causing groutable spaces between said elongate strips;

grinding the elongate strips to an arcuate contour and thereafter;

grouting said groutable spaces with a settable material; and smoothing the settable material to form a contiguous surface with said elongate strips.

* * * * *